United States Patent
Neumann et al.

(10) Patent No.: US 7,239,752 B2
(45) Date of Patent: Jul. 3, 2007

(54) EXTENDABLE TRACKING BY LINE AUTO-CALIBRATION

(75) Inventors: Ulrich Neumann, Manhattan Beach, CA (US); Bolan Jiang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 792 days.

(21) Appl. No.: 10/278,349

(22) Filed: Oct. 22, 2002

(65) Prior Publication Data

US 2003/0076996 A1  Apr. 24, 2003

Related U.S. Application Data

(60) Provisional application No. 60/336,208, filed on Oct. 22, 2001.

(51) Int. Cl.
G06K 9/46 (2006.01)
(52) U.S. Cl. .................................. 382/201; 345/633
(58) Field of Classification Search .............. 382/100, 382/103, 106, 107, 199, 201; 345/632, 633, 345/427, 581, 629
See application file for complete search history.

(56) References Cited

U.S. PATENT DOCUMENTS 5,424,556 A   6/1995  Symosek et al.
6,046,745 A * 4/2000  Moriya et al. .............. 345/420
6,985,620 B2 * 1/2006  Sawhney et al. ........... 382/154
2002/0084974 A1 * 7/2002  Ohshima et al. ............ 345/156

OTHER PUBLICATIONS

Neumann et al. (Extendible Tracking by Line Auto-Calibration, Jiang, B., Neumann, U.; Augmented Reality, 2001, Proceedings IEEE and ACM International Symposium on Oct. 29-30, 2001; pp. 97-103).*
Azuma, Ronald T. A Survey of Augmented Reality. In Teleoperators andVirtual Environments 6, 4, Aug. 1997, pp. 355-385.

(Continued)

*Primary Examiner*—Vikkram Bali
*Assistant Examiner*—Anand Bhatnagar
(74) *Attorney, Agent, or Firm*—McDermott Will & Emery LLP (57) ABSTRACT

Methods and systems for tracking camera pose using dynamically calibrated line features for augmented reality applications are disclosed. The dynamic calibration of the line features affords an expanded tracking range within the real environment and into adjacent, un-calibrated areas. Line features within a real environment are modeled with a minimal representation, such that they can be efficiently dynamically calibrated as a camera pose changes within the environment. A known camera pose is used to initialize line feature calibration within the real environment. Parameters of dynamically calibrated line features are also used to calculate camera pose. The tracking of camera pose through a real environment allows insertion of virtual objects into the real environment without dependencies on pre-calibrated landmarks.

16 Claims, 2 Drawing Sheets

OTHER PUBLICATIONS

Kumar, Rakesh et al. Robust Methods for Estimating Pose and a Sensitivity Analysis. In CVGIP-IU, 1994. 41 pages.

Neumann, Ulrich et al., A Self-Tracking Augmented Reality System. In ACM International Symposium on Virtual Reality and Applications, 1996. pp. 109-115.

Neumann, Ulrich, Extendible Object-Centric Tracking for Augmented Reality In Proceedings of IEEE VRAIS '98. Mar. 1998, pp. 148-155.

State, Andrei, Superior Augmented Reality Registration by Integrating Landmark Tracking and Magnetic Tracking. In Proc. SIGGRAPH 96 (New Orleans, LA, Aug. 4-9, 1996). In Computer Graphics Proceedings, Annual Conference Series 1996, ACM SIGGRAPH, pp. 429-438.

Stricker, Didier et al. A Fast and Robust Line-based Optical Tracker for Augmented Reality Applications. In Proceedings of International Workshop on Augmented Reality 1998, pp. 129-145.

Vieville, Thierry et al. Feed-Forward Recovery of Motion and Structure from a Sequence of 2D-Lines Matches. 1990. IEEE Proceedings, pp. 517-520.

Welch, Greg et al. SCAAT: Incremental Tracking with Incomplete Information. In Computer Graphics, 31 (Annual Conference Series): 1997, pp. 333-344.

* cited by examiner

EXTENDABLE TRACKING BY LINE AUTO-CALIBRATION

CROSS REFERENCE TO RELATED APPLICATION

This application is related to and claims the benefit of the filing date of U.S. provisional application Ser. No. 60/336, 208, filed Oct. 22, 2001, entitled "Extendable Tracking by Line Auto-Calibration," the contents of which are incorporated herein by reference.

GOVERNMENT LICENSE RIGHTS

The U.S. Government has a paid-up license in this invention and the right in limited circumstances to require the patent owner to license others on reasonable terms as provided for by the terms of EEC-9529152 awarded by National Science Foundation.

BACKGROUND OF THE INVENTION

1. Field of the Invention

The present invention relates generally to tracking systems used in conjunction with augmented reality applications.

2. Description of Related Art

Augmented reality (AR) systems are used to display virtual objects in combination with a real environment. AR systems have a wide range of applications, including special effects for movies, display of medical data, and training using simulation environments. In order to effectively achieve the illusion of inserting a virtual object into a real environment, a user's viewpoint (hereinafter "camera pose") within the real environment, which will change as the user moves about within the real environment, must be accurately tracked as it changes.

Generally, a camera pose within a real environment can be initialized by utilizing pre-calibration of real objects within the environment. By pre-calibrating the position of certain objects or features within the real environment and analyzing the image generated by the initial perspective of the camera pose, the parameters of the initial camera pose can be calculated. The camera pose is thereby initialized. Subsequently, a camera's moving viewpoint must be tracked as it changes within the real environment, so that virtual objects can be combined with the real environment appropriately and realistically, according to the camera's viewpoint in any given frame. This type of tracking is termed "object-centric tracking," in that it utilizes objects within the real environment to track the changing camera pose. Effectiveness of AR systems depends at least in part upon alignment and annotation of real objects within the environment.

Various types of object-centric tracking systems for use with augmented reality systems have been utilized in the past. For example, self-tracking systems using point features that exist on objects within a real environment have been used to track camera pose within the environment (R. Azuma, "Survey of Augmented Reality." *Presence: Teleoperators and Virtual Enviornments* 6 (4), 355–385 (August 1997); U. Neumann and Y. Cho, "A Self-Tracking Augmented Reality System." *Proceedings of ACM Virtual Reality SOftware and Technology*, 109–115 (July 1996); J. Park, B. Jiang, and U. Neumann, "Vision-based Pose Computation: Robust and Accurate Augmented Reality Tracking." *Proceedings of International Workshop on Augmented Reality (IWAR)'99* (October 1999); A. State, G. Hiorta, D. Chen, B. Garrett, and M. Livington, "Superior Augmented Reality Registration by Integrating Landmark Tracking and Magnetic Tracking." *Proceedings of SIGGRAPH* '96; G. Welch and G. Bishop, "SCAAT: Incremental Tracking with Incomplete Information." *Proceedings of SIGGRAPH* '96, 429–438 (August 1996)). These and other similar systems require prepared environments in which the system operator can place and calibrate artificial landmarks. The known features of the pre-calibrated landmarks are then used to track the changing camera poses. Unfortunately, such pre-calibrated point feature tracking methods are limited to use within environments in which the pre-calibrated landmarks are visible. Should the camera pose stray from a portion of the environment in which the pre-calibrated point features are visible, the tracking method degrades in accuracy, eventually ceasing to function. Therefore, such systems have limited range and usefulness.

Other tracking methods have been utilized for the purpose of reducing the dependence on visible landmarks, thus expanding the tracking range within the environment, by auto-calibrating unknown point features in the environment (U. Neumann and J. Park, "Extendible Object-Centric Tracking for Augmented Reality." *Proceedings of IEEE Virtual Reality Annual International Symposium* 1998, 148–155 (March 1998); B. Jiang, S. You and U. Neumann, "Camera Tracking for Augmented Reality Media," *Proceedings of IEEE International Conference on Multimedia and Expo* 2000, 1637–1640, 30 Jul. –2 Aug. 2000, New York, N.Y.). These and similar tracking methods use "auto-calibration," which involves the ability of the tracking system to dynamically calibrate previously un-calibrated features by sensing and integrating the new features into its tracking database as it tracks the changing camera pose. Because the tracking database is initialized with only the pre-calibration data, the database growth effect of such point feature auto-calibration tracking methods serves to extend the tracking region semi-automatically. Such point feature auto-calibration techniques effectively extended the tracking range from a small prepared area occupied by pre-calibrated landmarks to a larger, unprepared area where none of the pre-calibrated landmarks are in the user's view. Unfortunately, however, such tracking methods rely only on point features within the environment. These methods are therefore ineffective for environments that lack distinguishing point features, or for environments in which the location coordinates of visible point features are unknown. Moreover, these methods for recovering camera poses and structures of objects within the scene produce relative camera poses rather than absolute camera poses, which are not suitable for some augmented reality applications.

Still other tracking methods utilize pre-calibrated line features within an environment (R. Kumar and A. Hanson, "Robust Methods for Estimating Pose and a Sensitivity Analysis," *CVGIP: Image Understanding*, Vol. 60, No. 3, November, 313–342, 1994). Line features provide more information than point features and can therefore be tracked more reliably than point features. Line features are also useful for tracking purposes in environments having no point features or unknown point features. However, the mathematical definition for a line is much more complex than that of a simple point feature. Because of the mathematical complexities associated with defining lines, line features have not been suitable for auto-calibration techniques the way that mathematically less-complex point features have been. Therefore, tracking methods utilizing line features have been dependent upon the visibility of pre-calibrated landmarks, and inherently have a limited environment range. Line feature tracking methods have therefore not been suitable for larger environments in which line features are unknown and un-calibrated, and in which pre-calibrated line features are not visible.

SUMMARY OF THE INVENTION

In view of the various problems discussed above, there is a need for a robust augmented reality tracking system that uses un-calibrated line features for tracking. There is also a need for line feature tracking system that is not dependent on visible pre-calibrated line features.

In one aspect of the present invention, a method for estimating a camera pose from which an image of a real environment is viewed includes identifying a line feature within the image, identifying values for each of four parameters that define the line feature, estimating values for each of a plurality of parameters for the camera pose, and solving a system of equations that involves the four line feature parameters and the camera pose parameters by inserting the identified values for each of the four line feature parameters and the estimated values for the plurality of parameters for the camera pose.

In another aspect of the present invention, a method for auto-calibrating a line feature within a real environment includes identifying a line feature in a first image of an environment viewed from a first camera pose, identifying the line feature in a second image of the environment viewed from a second camera pose, and using a first set of camera pose parameters defining the first camera pose and a second set of camera pose parameters defining the second camera pose to calculate four line feature parameters that define the identified line feature.

In yet another aspect of the present invention computer-readable media contains instructions executable by a computer that, when loaded and executed on a computer, cause a method of estimating a camera pose from which an image of a real environment is viewed, including identifying a line feature within the image, identifying values for each of four parameters that define the line feature, estimating values for each of a plurality of parameters for the camera pose, and solving a system of equations that involves the four line feature parameters and the camera pose parameters by inserting the identified values for each of the four line feature parameters and the estimated values for the plurality of parameters for the camera pose.

In a further aspect of the present invention, computer-readable media contains instructions executable by a computer that, when loaded and executed on a computer, cause a method of auto-calibrating a line feature within a real environment, including identifying a line feature in a first image of an environment viewed from a first camera pose, identifying the line feature in a second image of the environment viewed from a second camera pose, and using a first set of camera pose parameters defining the first camera pose and a second set of camera pose parameters defining the second camera pose to calculate four line feature parameters that define the identified line feature.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION OF ILLUSTRATIVE EMBODIMENTS

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

Figure 1:
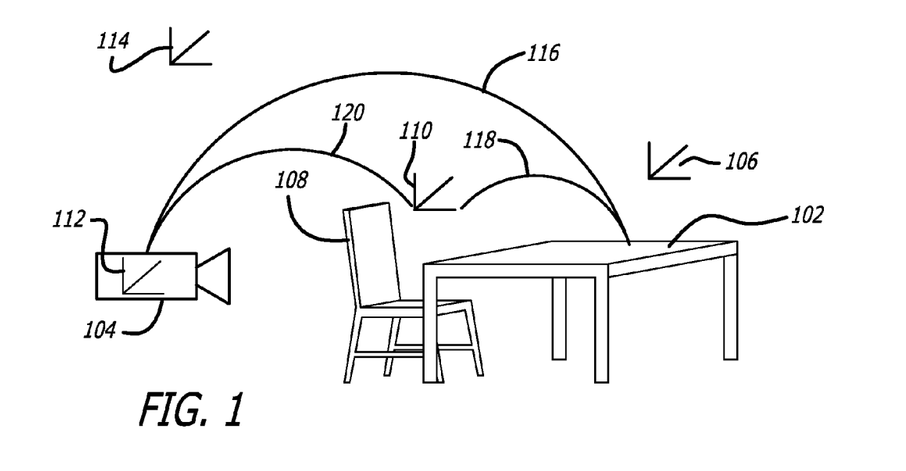
FIG. 1 illustrates an exemplary environment in which a camera pose is tracked relative to the position of a real object within the environment, such that virtual objects can be appropriately added to the environment.

FIG. 1 illustrates an environment in which a camera pose is tracked relative to the position of a real object within the environment, such that virtual objects can be appropriately added to the environment. Specifically, the environment shown in FIG. 1 includes a real table 102 and is viewed by a camera 104. In order to relate each object in the environment to every other object therein, transformations are made between the local coordinate systems of each of the objects. For example, table 102 exists within a "real" coordinate system 106, virtual chair 108 exists within a "virtual" coordinate system 110, camera 104 exists within a "camera" coordinate system 112, and each of these is independently related to the "world" coordinate system 114 of the real world.

By tracking the camera pose as it changes within the environment, relative to the fixed world coordinate system, the relative positions of the table 102 and chair 108 are preserved. The tracking process involves transformations between each of the local coordinate systems. Arc 116 represents the transformation that is made between "real" coordinate system 106 and "camera" coordinate system 112, and arc 118 represents the transformation that is made between "real" coordinate system 106 and "virtual" coordinate system 110. Similarly, arc 120 represents the transformation that is made between "camera" coordinate system 112 and "virtual" coordinate system 110. Each of these arcs is interrelated and represents transformations between any of the local and world coordinate systems represented by objects within the environment. Each of the objects in the environment has position coordinates in its own coordinate system that, when transformed with the appropriate transformation matrix, can be represented correctly in a different coordinate system. Thus, the positional coordinates for each of the objects can be maintained relative to one another by performing the appropriate transformations as indicated by arcs 116 and 118. This is necessary in order to accurately determine placement of any virtual objects that are to be inserted into the environment. By knowing the transformation between the local "camera" coordinate system 112 and each virtual object within the "virtual" coordinate system 110, each virtual object can be placed correctly in the environment, to have a legitimate appearance from the camera's perspective.

As described above, one embodiment of the invention involves tracking an un-calibrated line feature within an environment as the camera pose changes. For example, in FIG. 1, table 102 comprises a plurality of line features, such as those composing the table top or any one of the legs. One such line feature may be selected in a first frame viewed of the environment by camera 104, and tracked through multiple subsequent frames. By tracking the single line feature through multiple frames, the relative positions of each of the objects, including the camera pose itself, can also be tracked and maintained according to their relative positions. Tracking calculations involving multiple series of transformations as discussed above are generally complex. Therefore, in order to be efficient and feasible, a tracked line feature is modeled with a minimal representation. In an exemplary embodiment of the invention, a line feature is modeled with a minimal representation, having not more than four variable parameters. The minimally modeled line feature thus has not greater than four degrees of freedom, and is therefore suitable for the complex mathematical calculations involved in the dynamic calibration tracking methods described herein.

Figure 2:
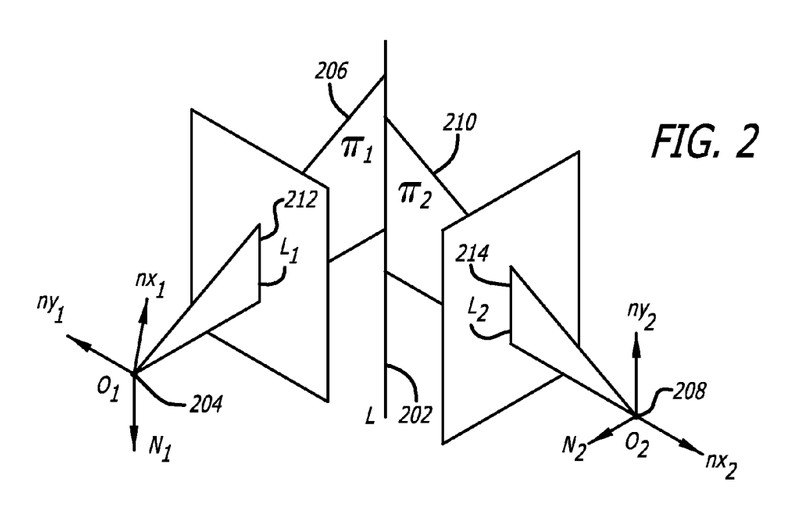
FIG. 2 illustrates an exemplary method for calculating a minimal representation for a tracked line feature, the minimal representation including not more than four variable parameters.

FIG. 2 illustrates an exemplary method for representing a tracked line feature with four unique variable parameters ($n_{x1}$, $n_{y1}$, $n_{x2}$, $n_{y2}$) and four constant parameters ($T_1$, $R_1$, $T_2$, $R_2$). It is to be understood that each of the four constant parameters includes more than one element. For example, in the exemplary embodiment, $T_1$ and $T_2$ are each three-dimensional vectors, and $R_1$ and $R_2$ are each 3×3 rotation matrices. Therefore, $T_1$ and $T_2$ represent a total of six elements, while $R_1$ and $R_2$ represent a total of 18 elements. However, each vector $T_1$, $T_2$, and each rotation matrix $R_1$, $R_2$ is herein referred to as a "constant parameter," and it is to be understood that each constant parameter includes within it a plurality of elements. In the exemplary embodiment, tracking a line feature within an environment through several images of that environment captured by a camera at different camera positions involves first identifying and calibrating the line segment. When a 3 dimensional (3D) line (L) 202 is viewed in an image, and camera pose for the image is already known, the camera center ($O_1$) 204 and the detected line segment $l_1$ 212 form a back projected plane ($\pi_1$) 206 passing through the 3D line (L) 202. If the 3D line (L) 202 is viewed in a second image by the camera at a new camera center ($O_2$) 208, such that a second back projected plane ($\pi_2$) 210 passes through the 3D line (L) 202, these two back projected planes ($\pi_1$, $\pi_2$) 206, 210 can define the 3D line (L) 202. Specifically, the intersection of planes 206, 210 define line 202.

The plane $\pi_1$ 206 may be represented as $$\begin{pmatrix} n_1 \\ d_1 \end{pmatrix}$$

in world coordinates, where $n_1$ is a three-dimensional vector and $d_1$ is a scalar. The plane $\pi_2$ can be represented similarly as $$\begin{pmatrix} n_2 \\ d_2 \end{pmatrix}.$$

Although the 3D line (L) 202 may be represented by the intersection of these two planes, this representation $$\begin{pmatrix} n_1 \\ d_1 \end{pmatrix} \text{ and } \begin{pmatrix} n_2 \\ d_2 \end{pmatrix}$$

for the 3D line (L) 202 is not minimal. 3D line (L) 202 eventually is represented in terms of four unique variable parameters $n_{x1}$, $n_{y1}$, $n_{x2}$, $n_{y2}$, and four constant parameters $T_1$, $R_1$, $T_2$, $R_2$. The four variable parameters, $n_{x1}$, $n_{y1}$, $n_{x2}$, $n_{y2}$, define two planes defining the 3D line (L) 202 in two local coordinate systems, that are in turn defined by the constant parameters $T_1$, $R_1$, $T_2$, $R_2$. In a first local coordinate system whose origin is a first camera center $O_1$ 204, the plane is represented by the normal vector $N_1=(L_{x1}, L_{y1}, L_{z1})$ to the plane. Similarly, the plane $\pi_2$ can be locally defined in a second local coordinate system, whose origin is a second camera center $O_2$ 208, by the normal $N_2=(L_{x2}, L_{y2}, L_{z2})$. It then follows that the representation for the two planes can be reduced to four dimensions by the local representations as follows:

$$\begin{pmatrix} L_{x1} \\ L_{y1} \\ L_{z1} \end{pmatrix} = R_1^T (\lambda n_1 - \mu n_2)$$

$n_{x1} = L_{x1}/L_{z1}$ $n_{y1} = L_{y1}/L_{z1}$ where $\lambda = T_1^T n_2 + d_2$ $\mu = T_1^T n_1 + d_1$ and $$\begin{pmatrix} L_{x2} \\ L_{y2} \\ L_{z2} \end{pmatrix} = R_2^T(\lambda n_1 - \mu n_2)$$

$n_{x2} = L_{x2}/L_{z2}$ $n_{y2} = L_{y2}/L_{z2}$ where $\lambda = T_2^T n_2 + d_2$ $\mu = T_2^T n_1 + d_1$ As described above, the constant parameters $T_1$, $R_1$, $T_2$, $R_2$ are transformations between the two local coordinate systems and the world coordinate system, respectively. Of course, it is to be understood that camera centers $O_1$ 204 and $O_2$ 208 are not the only choices for placement of origins of the local coordinate systems. Rather, the local coordinate systems can be centered anywhere other than on the 3D line (L) 202 itself. Aside from this restriction, however, other camera center origins $O_1$ 204 and $O_2$ 208 will establish two different planes with the 3D line (L) 202 to represent the line. The system of equations above, then, is used to compute the parameters for the minimal representation for these two different planes. For any given constant parameters $T_1$, $R_1$, $T_2$, $R_2$, the representation for 3D line (L) 202 may be uniquely defined by varying the four the variable parameters $n_{x1}$, $n_{y1}$, $n_{x2}$, $n_{y2}$. However, it will be recognized by those skilled in the art that for any given constant parameters $T_1$, $R_1$, $T_2$, $R_2$, not every line within a 3D space can be represented by the four variable parameters $n_{x1}$, $n_{y1}$, $n_{x2}$, $n_{y2}$. For example, lines passing through camera centers $O_1$ 204 and $O_2$ 208, and lines for which one of the normals to the planes $\pi_1$ 206 and $\pi_2$ 210 is parallel to the X-Y plane of its corresponding local coordinate system may not be defined by the minimal representation described herein. Nevertheless, the minimal representation represented by the four variable parameters $n_{x1}$, $n_{y1}$, $n_{x2}$, $n_{y2}$ is sufficient to represent a subgroup of all the lines in a 3D space with a given set of constant parameters $T_1$, $R_1$, $T_2$, $R_2$. In other words, within a subgroup of lines that share one common set of values for the constant parameters $T_1$, $R_1$, $T_2$, $R_2$, the set of variable parameters $n_{x1}$, $n_{y1}$, $n_{x2}$, $n_{y2}$, is sufficient to define every line within the subgroup uniquely. Different values for the constant variables $T_1$, $R_1$, $T_2$, $R_2$ may represent different subgroups of all of the 3D lines within a given space. Therefore, the representation for all of the 3D lines in the space can be achieved by unifying the representations for different subgroups. A 3D line can be represented in different subgroups with different values for the set of constant parameters $T_1$, $R_1$, $T_2$, $R_2$, and the corresponding values for the variable parameters $n_{x1}$, $n_{y1}$, $n_{x2}$, $n_{y2}$ for this 3D line will be different within each of the different subgroups.

FIG. 2 illustrates an exemplary method for representing a tracked line feature with four unique variable parameters ($n_{x1}$, $n_{y1}$, $n_{x2}$, $n_{y2}$). Four constant parameters ($T_1$, $R_1$, $T_2$, $R_2$) are related to what is shown in FIG. 2 and are now explained. It is to be understood that each of the four constant parameters includes more than one element. For example, in the exemplary embodiment, $T_1$ and $T_2$ are each three-dimensional vectors, and $R_1$ and $R_2$ are each 3×3 rotation matrices.

Therefore, $T_1$ and $T_2$ represent a total of six elements, while $R_1$ and $R_2$ represent a total of 18 elements. However, each vector $T_1$, $T_2$, and each rotation matrix $R_1$, $R_2$ is herein referred to as a "constant parameter," and it is to be understood that each constant parameter includes within it a plurality of elements. In the exemplary embodiment, tracking a line feature within an environment through several images of that environment captured by a camera at different camera positions involves first identifying and calibrating the line segment. When a 3 dimensional (3D) line (L) 202 is viewed in an image, and camera pose for the image is already known, the camera center ($O_1$) 204 and the detected line segment l1 212 form a back projected plane ($\pi_1$) 206 passing through the 3D line (L) 202. If the 3D line (L) 202 is viewed in a second image by the camera at a new camera center ($O_2$) 208, such that a second back projected plane ($\pi_2$) 210 passes through the 3D line (L) 202, these two back projected planes ($\pi_1$, $\pi_2$) 206, 210 can define the 3D line (L) 202. Specifically, the intersection of planes 206, 210 define line 202.

From the first camera center ($O_1$) 204, the viewed portion of line (L) 202 is defined as $l_1$ 212, and from the second camera center ($O_2$) 208, the viewed portion of line (L) 202 is defined as $l_2$ 214. $l_1$ 212 and $l_2$ 214 are vector representing the projected image of line (L) 202 in the local coordinate systems of the first and second camera centers, 204, 208, respectively. It is to be understood that $l_1$ 212 and $l_2$ 214 are projected line segments, while the 3D line (L) 202 is an infinite line. Because the parameters of the camera are known, the camera projection matrix for each image is also known. Specifically, where the first camera pose is defined as ($T_{c1}$, $R_{c1}$) for the first camera center ($O_1$) 204 and the second camera pose is defined as ($T_{c2}$, $R_{c2}$) for the second camera center ($O_2$) 208, the intrinsic camera matrix is:

$$K = \begin{bmatrix} Fu & 0 & u_0 \\ 0 & Fv & v_0 \\ 0 & 0 & 1 \end{bmatrix},$$

where f is the focal length, $\alpha$ is the aspect ratio and ($u_0$, $v_0$) is the image center. The projection matrices, which are defined as $P_1$ for the first camera center ($O_1$) 204 and $P_2$ for the second camera center ($O_2$) 208 are calculated as $P_1 = K(R_{c1}^T, -R_{c1}^T T_{c1})$ $P_2 = K(R_{c2}^T, -R_{c2}^T T_{c2})$ Then, back projected planes ($\pi_1$, $\pi_2$) 206, 210 are represented in "world" coordinates as:

$$\pi_1 = \begin{pmatrix} n_1 \\ d_1 \end{pmatrix} = P_1^T l_1$$

$$\pi_2 = \begin{pmatrix} n_2 \\ d_2 \end{pmatrix} = P_2^T l_2$$

Because projection matrices $P_1$ and $P_2$ are known, and the coordinates for observed line segments $l_1$ and $l_2$ are viewed and identified, $n_1$, $d_1$, $n_2$ and $d_2$ are easily solved for. Once these values are known, they are used in the previous system of equations to solve for the four variable parameters $n_{x1}$, $n_{y1}$, $n_{x2}$, $n_{y2}$, for the line (L) 202 and the constant parameters $T_1$, $R_1$, $T_2$, $R_2$, which is thereby dynamically calibrated to a minimal representation having not more than four degrees of freedom.

After 3D line (L) 202 is detected and calibrated, it can be continually dynamically calibrated in subsequent images from different camera poses. Because of the minimal line representation described above, involving only the update for four variable parameters $n_{x1}$, $n_{y1}$, $n_{x2}$, $n_{y2}$, with a given set of constant parameters $T_1$, $R_1$, $T_2$, $R_2$, the dynamic calibration of line features in images of an environment during an estimation update process can be efficiently accomplished.

In another exemplary embodiment of the environment, a known representation of a line feature visible within an image can be used to compute an unknown camera pose from which the image was generated. As described above, a 3D line can be represented by the intersection of two planes $\pi_1$ and $\pi_2$. Each of these two planes, as described above, is represented by the minimal representation of variable parameters $n_{x1}$, $n_{y1}$, $n_{x2}$, $n_{y2}$ and the constant parameters $T_1$, $R_1$, $T_2$, $R_2$.

The "world" coordinate representations of the two planes $\pi_1$ and $\pi_2$ are $$\begin{pmatrix} n_1 \\ d_1 \end{pmatrix} \text{ and } \begin{pmatrix} n_2 \\ d_2 \end{pmatrix}$$

respectively, which can be calculated as:

$$\begin{cases} n_1 = R_1 n_{l1}, \text{ and } d_1 = -T_1^T R_1 n_{l1} \\ n_2 = R_2 n_{l2}, \text{ and } d_2 = -T_2^T R_2 n_{l2} \end{cases}, \text{ where } \begin{cases} n_{l1} = (n_{x1}, n_{y1}, 1) \\ n_{l2} = (n_{x2}, n_{y2}, 1) \end{cases}.$$

The camera pose $x_c$, which comprises camera translation matrix $T_c$ and rotation matrix $R_c$, is used to convert between the "world" coordinate system and the "camera" coordinate system, and must be determined. These two matrices can be calculated from the known features of the planes $\pi_1$ and $\pi_2$, which are defined above according to the known features of the 3D line (L). Specifically, the two planes $\pi_1$ and $\pi_2$ can be represented in each of the "camera" coordinate systems as $$\begin{pmatrix} R_c^T n_1 \\ T_c^T n_1 + d_1 \end{pmatrix} \text{ and } \begin{pmatrix} R_c^T n_2 \\ T_c^T n_2 + d_2 \end{pmatrix},$$

respectively.

Figure 3:
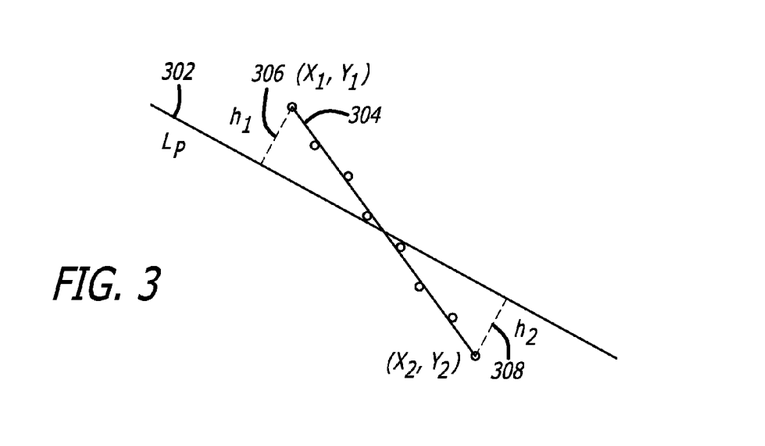
FIG. 3 illustrates an exemplary line feature that is being tracked and is projected onto the image captured by the camera whose pose is unknown and being calculated.

FIG. 3 illustrates an exemplary line feature that is being tracked and is projected onto the image captured by the camera whose pose is unknown and being calculated according to the exemplary method now described. The detected line segment 304 is the image projection of the line feature detected on the captured image. The projected line 302 is the estimation for the image projection of the line feature, based on the current estimate for camera pose and the 3D line structure. The projected line ($l_p$) 302 may be represented by the equation $xm_x + ym_y + m_z = 0$. Thus, the projected line 302 is represented by the three constants $m_x$, $m_y$, $m_z$ as follows:

$$l_p = \begin{pmatrix} m_x \\ m_y \\ m_z \end{pmatrix} = K^{-T}(R_c^T n_1 (T_c^T n_2 + d_2) - R_c^T n_2 (T_c^T n_1 + d_1))$$

To solve this equation for the projected line, an initial estimate for the camera pose is inserted into the equation. In an exemplary embodiment of the invention, the first estimate may be a known or calculated camera pose from a previous frame or another nearby image of the same environment. The camera pose estimate is used to supply initial values for $R_c$ and $T_c$ in the line equation ($l_p$) above. The minimal representation for the 3D line, comprising four variable parameters ($n_{x1}$, $n_{y1}$, $n_{x2}$, $n_{y2}$) and four constant parameters ($T_1$, $R_1$, $T_2$, $R_2$), is used to supply ($n_1$, $d_1$, $n_2$, $d_2$). Then estimated values for the projected line ($m_x$, $m_y$, $m_z$) are calculated, and the offsets $h_1$ and $h_2$ between the endpoints of this estimated line and the actual detected line 304 are calculated. Specifically, these offsets ($h_1$) 306 and ($h_2$) 308 are defined as follows:

$$\begin{cases} h_1 = \dfrac{x_1 m_x + y_1 m_y + m_z}{\sqrt{m_x^2 + m_y^2}} \\ h_1 = \dfrac{x_2 m_x + y_2 m_y + m_z}{\sqrt{m_x^2 + m_y^2}} \end{cases}$$

Next, as will be apparent to those skilled in the art, a non-linear solver such as, for example, a Kalman filter, may be applied to minimize these offsets, thereby establishing an approximate solution for the line equation by adjusting the initial camera pose estimate. An Extended Kalman Filter estimates camera pose by processing a camera state representation that includes, position, incremental orientation, and their first derivatives. It will be apparent to those skilled in the art how to apply a Kalman filter to estimate the camera pose and calibrate the projected image of 3D line (L) 202. Further details on Kalman filtering are provided, for example in, "Vision-based Pose Computation: Robust and Accurate Augmented Reality Tracking," and "Camera Tracking for Augmented Reality Media," incorporated herein by reference.

The adjusted camera pose estimate, which results as the output of the Kalman filter, is then used to supply the parameters of the previously unknown camera pose. Of course, it is understood that other non-linear solvers may be utilized for this purpose of minimizing the offset and approaching the closest estimation for the actual value of the camera pose parameters, and that the invention is not limited to utilization of a Kalman filter. The estimate for 3D structure of the line feature used in estimation for camera pose may then be updated by a non-linear solver. The non-linear solver, in an exemplary embodiment, may be the same one used for camera pose estimation. Moreover, the camera pose and the 3D structure of the line feature may be estimated simultaneously. Alternatively, separate non-linear solvers may be used to estimate the 3D structure of the line feature and to estimate the camera pose. In either case, the values for four variable parameters ($n_{x1}$, $n_{y1}$, $n_{x2}$, $n_{y2}$) for the 3D line feature are adjusted by the non-linear solver while the constant parameters ($T_1$, $R_1$, $T_2$, $R_2$) are unchanged.

In addition to the extension of environment that can be tracked utilizing the various methods described herein, the exemplary methods described above may be performed real-time during image capture routines, such that placement of virtual objects within a real scene is not limited to post-production processing. The methods may be software driven, and interface directly with video cameras or other image capture instruments.

Figure 4:
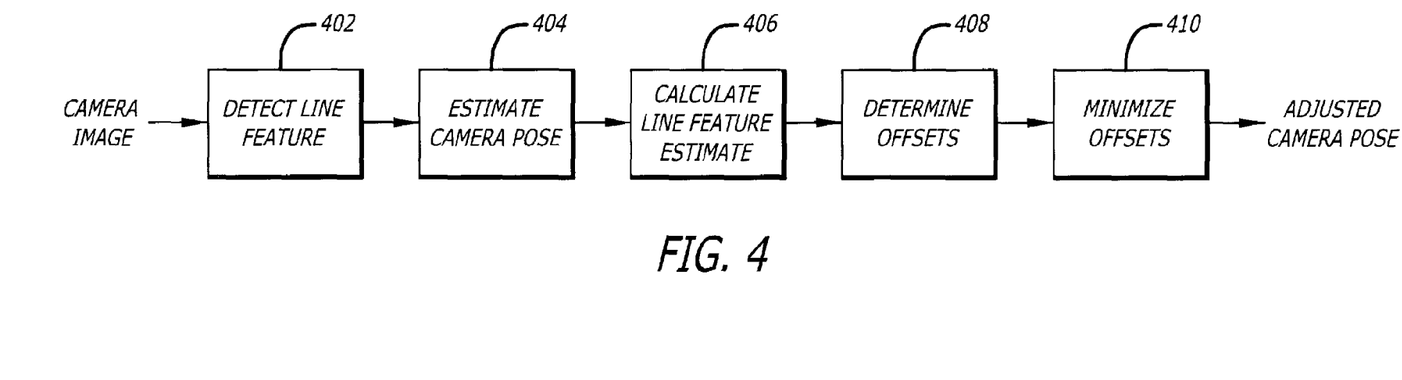
FIG. 4 is a functional block diagram that illustrates steps performed to calculate a camera pose from which an image containing a calibrated line feature was viewed.

FIG. 4 is a functional block diagram that illustrates steps performed by an exemplary software embodiment in which an unknown camera pose may be calculated from known parameters of a minimally represented line within an environment whose image is viewed from the unknown camera pose. From a camera image of a real environment, a line feature in that environment, as projected on the camera image, is detected at block 402. The representation for the 3D line is known either because the line feature was pre-calibrated or dynamically calibrated prior to capture of the camera image. If the line needs to be dynamically calibrated, the minimal representation, comprising the four variable parameters and the constant parameters, is used. It will be recognized by those skilled in the art that for a pre-calibrated line, which does not need to be dynamically calibrated, the minimal representation of the present invention is not necessary. At block 404, parameters for an estimated camera pose are inserted into the system of equations, along with the known parameters of the detected line feature. The estimated camera pose may be, for example, a previously calculated camera pose from a prior frame (e.g. a previous image captured in a sequence of images that includes the current image being processed). Based on the parameters of the estimated camera pose, the system of equations is solved to yield a line feature estimate, at block 406. The endpoints of the actual detected line will be offset from the projected line estimate, as indicated at 306, 308 in FIG. 3. This offset is calculated at block 408. Next, the estimated camera pose is adjusted through use of a non-linear solver, as indicated at block 410, to minimize the offsets. When the offsets are minimized, the adjusted camera pose is output as the calculated camera pose for the image. As described earlier, the non-linear solver may be, for example, a Kalman filter, a numerical method application, or other iterative approach suitable for minimizing the line feature offsets and approaching the adjusted camera pose solution. The four variable parameters of the 3D line can then be dynamically calibrated by the same or a separate non-linear solver, if necessary.

Figure 5:
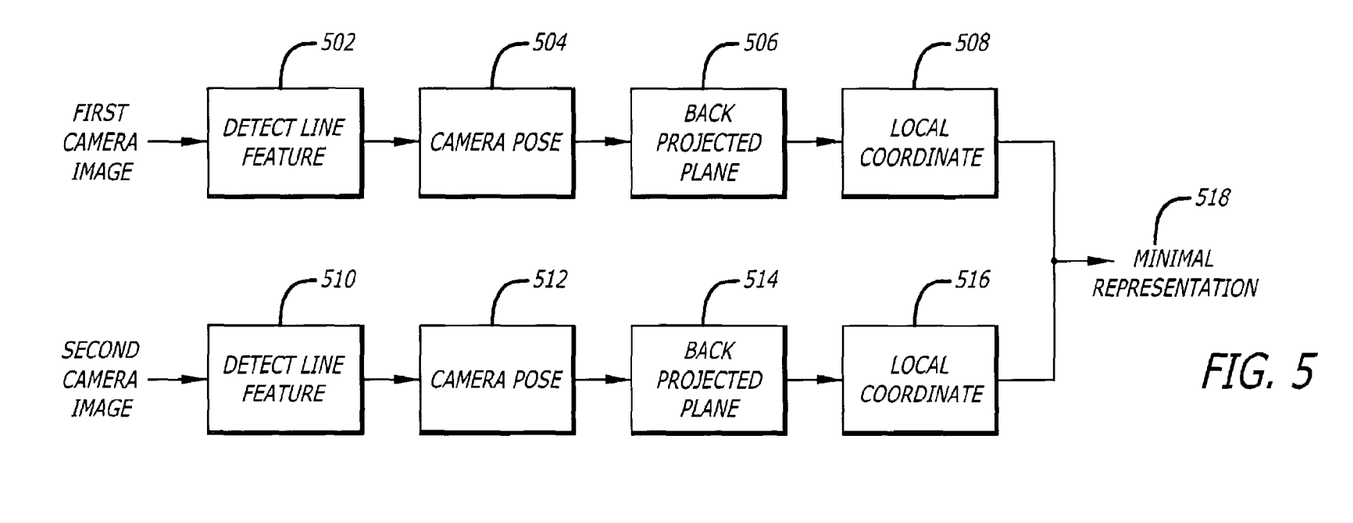
FIG. 5 is a functional block diagram that illustrates steps performed to calculate parameters for a minimal representation of a line feature that is projected in two different images for which the camera poses are known.

FIG. 5 is a functional block diagram that illustrates steps performed by an exemplary software embodiment for calculating four parameters to determine a minimal representation for a line feature tracked between two different images of an environment, where the camera poses for each of the images is previously known. At block 502, a 3D line feature viewed on a first camera image is detected. The parameters of this first camera pose are known and retrieved at block 504. With the camera pose and the detected line feature, the representation for the first back projected plane in world coordinates is recovered at block 506. Similarly, at block 510, the same 3D line feature is detected as it is viewed on a second camera image of the same environment. The parameters of the second camera pose are also known, and are retrieved at block 512. The second back projected plane is recovered at block 514. Next, the transformations for two local coordinate systems $(T_1, R_1)$ and $(T_2, R_2)$ are defined as described above at blocks 508 and 516. The solution for the four variable parameters of the minimal representation $(n_{x1}, n_{y1}, n_{x2}, n_{y2})$ is achieved according to the exemplary methods described above.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for estimating a camera pose from which an image of a real environment is viewed, comprising:
   (a) identifying a line feature within the image;
   (b) identifying values for each of four variable parameters that define the line feature in a local coordinate system that is known relative to a world coordinate system;
   (c) estimating values for each of a plurality of parameters for the camera pose;
   (d) solving a system of equations that involves the four variable parameters and the camera pose parameters by inserting the identified values for each of the four variable parameters and the estimated values for the plurality of parameters for the camera pose; and
   (e) assigning values for each of four constant parameters that define the line feature in the world coordinate system, wherein the constant parameters define rotation and translation transformations between the local coordinate system and the world coordinate system.

2. The method of claim 1 wherein the identifying a line feature within the image comprises detecting an image projection of a line segment of the 3D line.

3. The method of claim 1 wherein the system of equations additionally involves the four constant parameters.

4. The method of claim 1 wherein the estimated values for the plurality of parameters for the camera pose are derived from a different image of the real environment.

5. A method for estimating a camera pose from which an image of a real environment is viewed, comprising:
   (a) identifying a line feature within the image;
   (b) identifying values for each of four variable parameters that define the line feature in a local coordinate system that is known relative to a world coordinate system;
   (c) estimating values for each of a plurality of parameters for the camera pose; and
   (d) solving a system of equations that involves the four variable parameters and the camera pose parameters by inserting the identified values for each of the four variable parameters and the estimated values for the plurality of parameters for the camera pose, wherein the solving a system of equations includes applying a non-linear solver to improve the estimated values for each of the plurality of parameters for the camera pose, wherein the applying a non-linear solver to improve the estimated values for each of the plurality of parameters for the camera pose comprises:
      (1) identifying endpoints of a projected line segment image of the identified line feature;
      (2) estimating a projected image of an estimated line feature according to the estimated values for each of the plurality of parameters for the camera pose;
      (3) calculating values for offsets between the identified endpoints of the projected line image of the identified line feature and the estimated projected image of the estimated line feature; and (4) altering the estimated values for each of the plurality of parameters for the camera pose to cause a reduction in the value of the offset.

6. The method of claim 5 wherein the non-linear solver is a Kalman filter.

7. A method for auto-calibrating a line feature within a real environment, comprising:
 (a) identifying a first image projection of a line feature in a first image of an environment viewed from a first camera pose;
 (b) identifying a second image projection of the line feature in a second image of the environment viewed from a second camera pose; and
 (c) calculating four variable line feature parameters that define the identified line feature in a local coordinate system that is known relative to a world coordinate system, wherein the calculating four variable line feature parameters further comprises:
  (1) defining four constant parameters that, in conjunction with the four variable line feature parameters, define the line feature in the world coordinate system;
  (2) identifying a first plane that passes through a camera origin of the first camera pose and through the identified first image projection of the line feature, wherein the identifying the first plane comprises:
   (i) determining vector coordinates, in a coordinate system local to the camera origin of the first camera pose, for an image projection of the identified line feature in the first image;
   (ii) multiplying the vector coordinates by a projection matrix that defines the first camera pose; and
   (iii) describing the first plane, in the world coordinate system, in terms of the result of the multiplication; and
  (3) identifying a second plane that passes through a camera origin of the second camera pose and through the second image projection of the identified line feature.

8. A method for auto-calibrating a line feature within a real environment, comprising:
 (a) identifying a first image projection of a line feature in a first image of an environment viewed from a first camera pose;
 (b) identifying a second image projection of the line feature in a second image of the environment viewed from a second camera pose; and
 (c) calculating four variable line feature parameters that define the identified line feature in a local coordinate system that is known relative to a world coordinate system, wherein the calculating variable line feature parameters further comprises:
  (1) defining four constant parameters that, in conjunction with the four variable line feature parameters, define the line feature in the world coordinate system,
  (2) identifying a first plane that passes through a camera origin of the first camera post and through the identified first image projection of the line feature;
  (3) identifying a second plane that passes through a camera origin of the second camera pose and through the second image projection of the identified line feature;

(d) wherein the calculating four variable line feature parameters and the defining four constant parameters further comprise:
  (1) solving a system of equations that involves the four variable line feature parameters, the four constant parameters, and components of the identified first and second planes;
  (1) wherein the solution for the series of equations is constrained by limitations on a first local coordinate system of the first plane and a second local coordinate system of the second plane, as defined by the four constant parameters.

9. The method of claim 8 wherein the constraints comprise constant rotation matrices, each aligning the local coordinate systems of the first and second planes, respectively, when applied in the series of equations.

10. The method of claim 8 wherein the constraints comprise constant translation vectors, each defining a center of the first and second local coordinate systems in the world coordinate system, respectively, when applied in the series of equations.

11. A computer readable medium encoded with a computer program executable by a computer that, when loaded and executed on a computer, estimate a camera pose from which an image of a real environment is viewed, by:
 (a) identifying a line feature within the image;
 (b) identifying values for each of four variable parameters that define the line feature in a local coordinated system that is known relative to a world coordinate system;
 (c) estimating values for each of a plurality of parameters for the camera pose;
 (d) solving a system of equations that involves the four variable parameters and the camera pose parameters by inserting the identified values for each of the four variable parameters and the estimated values for the plurality of parameters for the camera pose;
 assigning values for each of four constant parameters that define the line feature in the world coordinate system, wherein the constant parameters define rotation and translation transformations between the local coordinate system and the world coordinate system.

12. A computer readable medium encoded with a computer program executable by a computer that, when loaded and executed on a computer, estimate a camera pose from which an image of a real environment is viewed, by:
 (a) identifying a line feature within the image;
 (b) identifying values for each of four variable parameters that define the line feature in a local coordinated system that is known relative to a world coordinate system;
 (c) estimating values for each of a plurality of parameters for the camera pose;
 (d) solving a system of equations that involves the four variable parameters and the camera pose parameters by inserting the identified values for each of the four variable parameters and the estimated values for the plurality of parameters for the camera pose, wherein the solving a system of equations includes applying a non-linear solver to improve the estimated values for each of the plurality of parameters for the camera pose, wherein the applying a non-linear solver to improve the estimated values for each of the plurality of parameters for the camera pose comprises:
  (1) identifying endpoints of a projected line segment image of the identified line feature;
  (2) estimating a projected image of an estimated line feature according to the estimated values for each of the plurality of parameters for the camera pose;

(3) calculating values for offsets between the identified endpoints of the projected line image of the identified line feature and the estimated projected image of the estimated line feature; and (4) altering the estimated values for each of the plurality of parameters for the camera pose to cause a reduction in the value of the offset.

13. A computer readable medium encoded with a computer program executable by a computer that, when loaded and executed on a computer, auto-calibrate a line feature within a real environment, by:

(a) identifying a first image projection of a line feature in a first image of an environment viewed from a first camera pose;

(b) identifying a second image projection of the line feature in a second image of the environment viewed from a second camera pose; and (c) calculating four variable line feature parameters that define the identified line feature in a local coordinate system that is known relative to a world coordinate system, wherein the calculating four variable line feature parameters further comprises:

(1) identifying a first plane that passes through a camera origin of the first camera pose and through the identified first image projection of the line feature; and (2) identifying a second plane that passes through a camera origin of the second camera pose and through the second image projection of the identified line feature.

(e) wherein the identifying the first plane comprises:

(1) determining vector coordinates, in a coordinate system local to the camera origin of the first camera pose, for an image projection of the identified line feature in the first image;

(2) multiplying the vector coordinates by a projection matrix that defines the first camera pose; and (3) describing the first plane, in the world coordinate system, in terms of the result of the multiplication.

14. A computer readable medium encoded with a computer program executable by a computer that, when loaded and executed on a computer, auto-calibrate a line feature within a real environment, by:

(a) identifying a first image projection of a line feature in a first image of an environment viewed from a first camera pose;

(b) identifying a second image projection of the line feature in a second image of the environment viewed from a second camera pose; and (c) calculating four variable line feature parameters that define the identified line feature in a local coordinate system that is known relative to a world coordinate system, wherein the calculating four variable line feature parameters further comprises defining four constant parameters that, in conjunction with the four variable line feature parameters, define the line feature in the world coordinate system;

(d) wherein the calculating four variable line feature parameters and the defining four constant parameters further comprise:

(1) solving a system of equations that involves the four variable line feature parameters, the four constant parameters, and components of identified first and second planes;

(2) wherein the solution for the series of equations is constrained by limitations on a first local coordinate system of the first plane and a second local coordinate system of the second plane, as defined by the four constant parameters.

15. The computer-readable media of claim 14 wherein the constraints comprise constant rotation matrices, each aligning the local coordinate systems of the first and second planes, respectively, when applied in the series of equations.

16. The computer-readable media of claim 14 wherein the constraints comprise constant translation vectors, each defining a center of the first and second local coordinate systems in the world coordinate system, respectively, when applied in the series of equations.

* * * * *